April 7, 1959     O. C. GESSLER     2,880,453
VEHICLE CLOSURE HINGE
Filed July 19, 1955     2 Sheets-Sheet 1
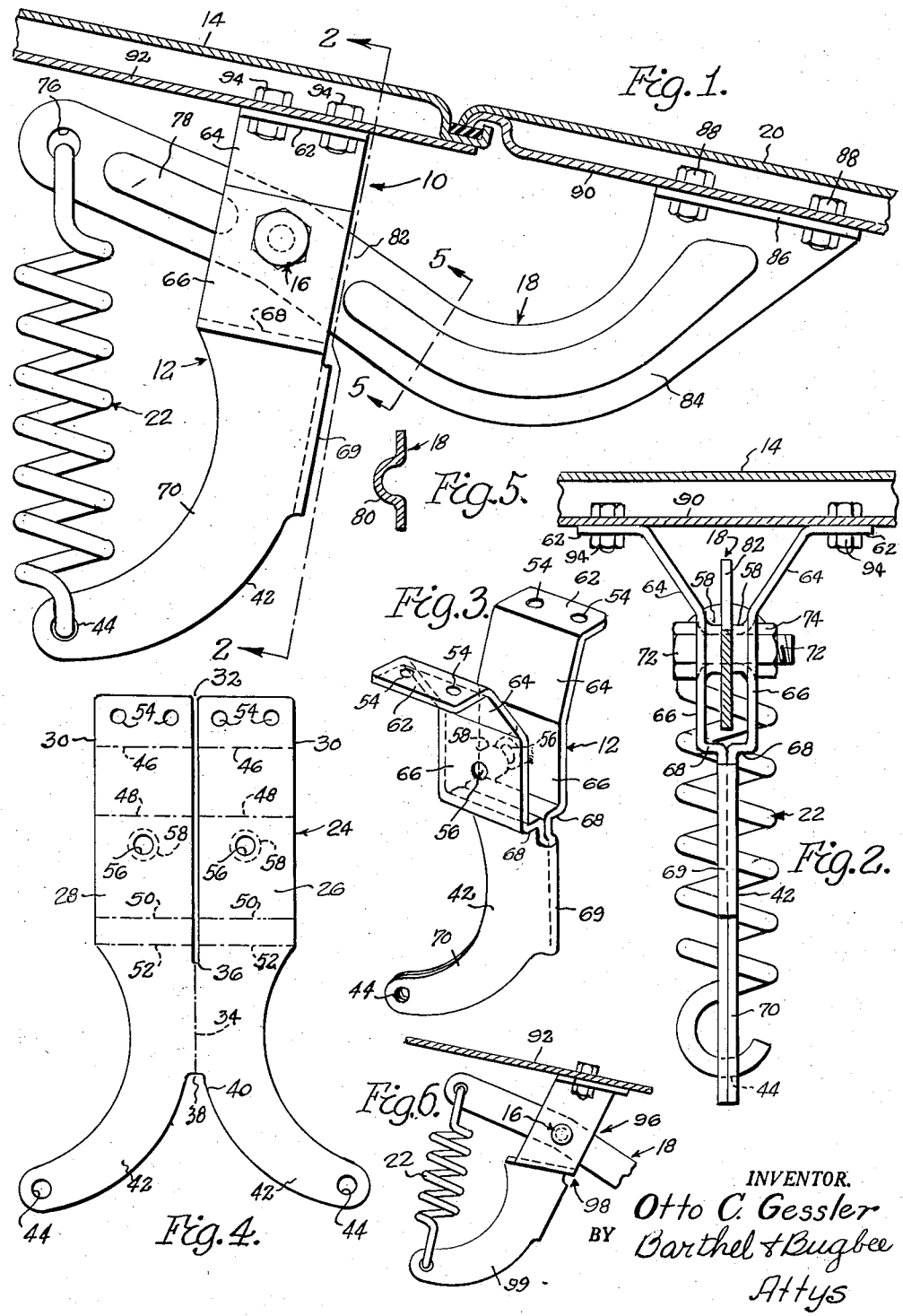
INVENTOR.
Otto C. Gessler
BY Barthel & Bugbee
Attys

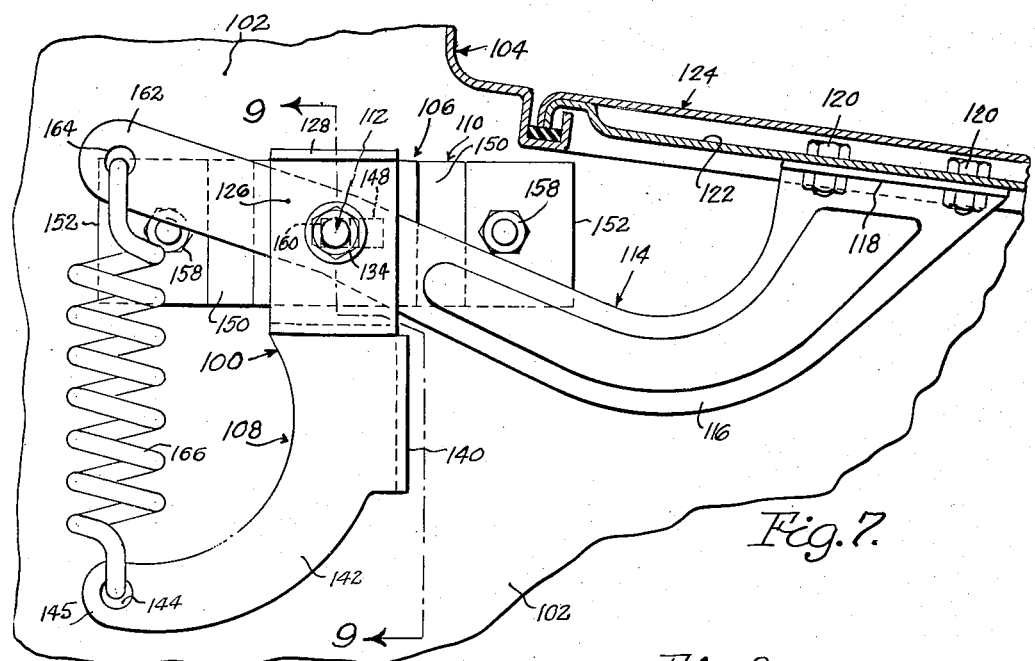
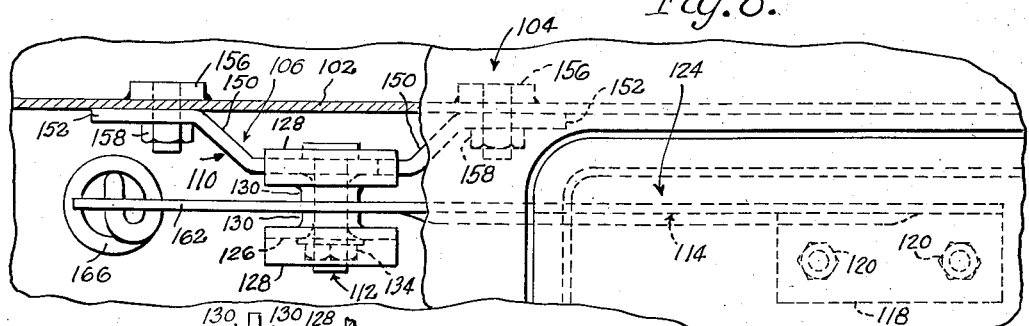
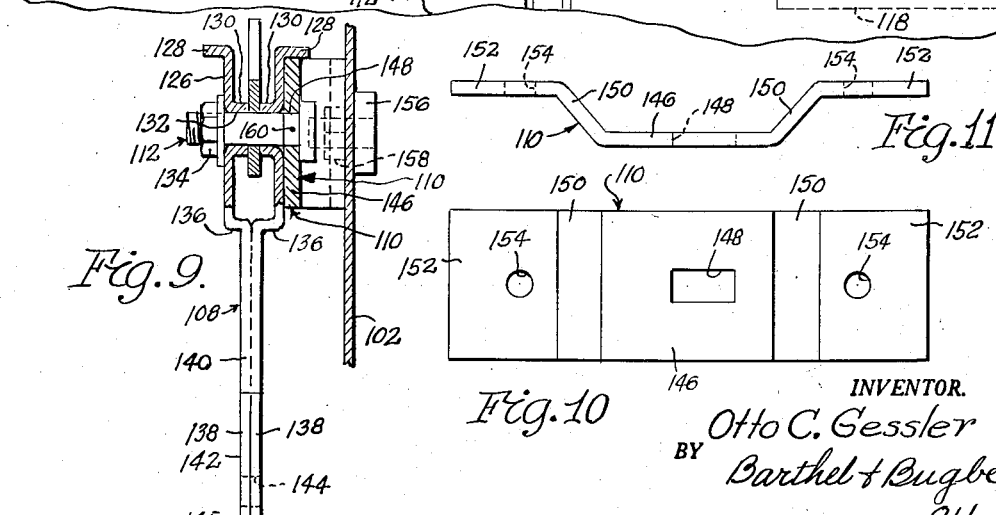

United States Patent Office 2,880,453
Patented Apr. 7, 1959

2,880,453

VEHICLE CLOSURE HINGE

Otto C. Gessler, Detroit, Mich.

Application July 19, 1955, Serial No. 522,961

2 Claims. (Cl. 16—190)

This invention relates to closure hinges and, in particular, to vehicle closure hinges.

One object of this invention is to provide a vehicle closure hinge composed of a minimum number of parts and formed in a simple and inexpensive manner from sheet metal stampings which are subjected to bending operations.

Another object is to provide a vehicle closure hinge of the foregoing character wherein the mounting bracket of the hinge is formed from a one-piece flat blank which is subjected to single bending operations to shape it into a strong rigid structure capable of sustaining heavy weights and powerful thrusts.

Another object is to provide a vehicle closure hinge of the foregoing character wherein the mounting bracket is easily shaped into a straight or inclined form by varying the bending operations upon the blank.

Another object is to provide a vehicle closure hinge equipped with a mounting bracket which is adapted to be secured to and depend from the rear deck of an automobile body, or a modified mounting bracket which is adapted to be secured to and project laterally from a vertical side bulkhead or wall of an automobile body rear compartment.

Other objects and advantages of the invention will become apparent during the course of the following description of the accompanying drawings, wherein:

Figure 1 is a side elevation of a vehicle closure hinge, according to one form of the invention, mounted on and depending from the rear deck of an automobile body, with the latter shown in longitudinal section;

Figure 2 is an approximately vertical section through the hinge of Figure 1, taken along the line 2—2 therein;

Figure 3 is a perspective view of reduced size showing the mounting bracket of the hinge of Figures 1 and 2;

Figure 4 is a top plan view of the one-piece sheet metal blank from which the mounting bracket of Figure 3 is formed by bending operations;

Figure 5 is a cross-section through the hinge arm of Figure 1, taken along the line 5—5 therein;

Figure 6 is a fragmentary side elevation of a slight modification of the hinge of Figure 1, with an inclined mounting bracket;

Figure 7 is a side elevation of a further modified vehicle closure hinge having a hinge bracket structure mounted on and projecting laterally from a vertical bulkhead or wall of the rear compartment of an automobile body, with the latter in longitudinal section;

Figure 8 is a top plan view of the hinge shown in Figure 7;

Figure 9 is an approximately vertical section taken along the zigzag line 9—9 in Figure 7;

Figure 10 is a side elevation of the mounting bracket support used in the modified hinge of Figures 7, 8 and 9; and Figure 11 is a top plan view of the mounting bracket support shown in Figure 10.

Referring to the drawings in detail, Figures 1 to 5 inclusive show a closure hinge, generally designated 10, according to one form of the invention as consisting generally of a hinge mounting bracket 12 bolted or otherwise secured to the vehicle body rear deck 14, a pivot element 16 passing therethrough, a hinge lever 18 pivotally mounted intermediate its ends on the pivot element 16 and having its outer end bolted or otherwise secured to the vehicle body closure or lid 20 and its inner end yieldably connected by a tension spring 22 to the free end of the mounting bracket 12. The mounting bracket 12 is formed from a flat sheet metal blank, generally designated 24, having right-hand and left-hand halves 26 and 28 separated from one another in their upper or base portions 30 by a longitudinal slot 32 and adapted to be bent along a longitudinal bending line 34 extending from the inner end 36 of the slot 32 to the inner end 38 of an approximately V-shaped notch 40 forming the apex of diverging arcuate arm halves 42 which terminates in holes 44 which are so positioned as to be aligned with one another after the bending operations have been completed along the longitudinal bending line 34. The base portions 30 of the halves 26 and 28 are also adapted to be bent transversely on four transverse bending lines 46, 48, 50 and 52 respectively in the manner described below and are also provided with fastener holes 54 and pivot element holes 56. The pivot element holes 56 are so positioned as to be aligned with one another in the finished mounting bracket (Figure 3) and are also provided with tubular bosses 58 projecting from one surface of the blank 24 and adapted to face one another (Figure 3) in the finished mounting bracket.

The finished mounting bracket 12, shown in Figure 3, is formed in suitable dies by bending operations along the longitudinal bending line 34 and transverse bending lines 46, 48, 50, 52 to form, in the order named, mounting tabs 62 disposed in a substantially common plane, spaced intermediate portions 64, parallel pivot mounting portions or leg portions 66 containing the pivot element holes 56 with the tubular bosses 58, and perpendicular portions 68 extending from the spaced parallel walls 66 into engagement with one another at the mutually-engaging arcuate arms 42 which in assembly are bent face to face along a connecting portion 69 to form the double-thickness bracket arm 70 terminating in the aligned holes 44.

The pivot element 16 which is inserted through the holes 56 and tubular bosses 58 (Figure 2) is of any suitable form, such as the bolt 72 shown in Figure 2, having a nut 74 threaded thereon. Alternatively, a rivet or pivot pin (not shown) may be employed in place of the pivot bolt 72, and preferably drilled to receive a cotter pin (not shown).

Hooked into the aligned holes 44 in the arcuate arm 70 is the lower end of the tension spring 22, the upper end of which is hooked into a hole 76 (Figure 1) in the inner end of the hinge lever 18. The latter is roughly J-shaped, being provided with longitudinal strengthening ribs 78 and 80 of U-shaped cross-section (Figure 5) and separated from one another by a flat portion 82 which is drilled to receive the pivot element 16 and which passes between the inner facing ends of the tubular bosses 58 (Figure 2). The curved end 84 of the lever 18 is provided with a transversely-bent mounting flange 86 which is drilled to receive the mounting bolts 88 passing through the inner wall 90 of the vehicle body closure 20. In a similar manner, the inner wall 92 of the vehicle body 14 is drilled to receive mounting bolts 94 by which the mounting bracket 12 is secured to and depends from the vehicle body rear deck 14.

In operation, the closure hinge 10 when mounted in the manner shown in Figure 1 with the closure or lid 20 in its closed position, rocks the hinge lever 18 around the pivot element 16 so as to cause the spring 22 to be placed under tension, thereby balancing or slightly overbalancing the weight of the closure 20. In the latter case, the use of a conventional latch or lock (not shown) is required in order to prevent the closure 20 from being lifted upward relatively to the vehicle deck or body 14 by the spring 22. It will be understood, of course, that each body is provided with at least two of the closure hinges 10 and also that the latter may be mounted on the cowl of an automobile body and used to control the action of the hood which covers the engine.

The modified closure hinge, generally designated 96, of Figure 6 is substantially of the same construction as that shown in Figures 1 to 5 inclusive, with the exception that the transverse bending lines 46, 48, 50 and 52 are slightly oblique to the edges of the mounting bracket 98, so that the latter is inclined slightly relatively to its mounting wall 92. The hinge lever 18, pivot element 16 and spring 22 are of substantially the same construction as shown in Figures 1 to 5 inclusive, hence require no further description. The slightly modified hinge bracket 98 enables the free ends of its arcuate arms 99 to be set back farther away from its mounting bolts than in the case of the mounting bracket 12 of Figure 1, so as to adapt it to slightly altered installation conditions.

The further modified closure hinge, generally designated 100, shown in Figures 7 to 9 inclusive, is intended for mounting upon a vertical wall or bulkhead 102 of a vehicle body 104, such as, for example, the bulkhead which separates the rear compartment of an automobile from the rear wheels and fenders. The mounting bracket structure, generally designated 106, is formed in two parts, namely a hinge bracket 108 somewhat resembling the hinge bracket 12 of Figure 1 and somewhat similarly formed from a flat blank resembling that shown in Figure 4, in the manner described above, and supported upon a support member 110. The mounting bracket 108 and its support member 110 carry a pivot element 112, such as a pivot bolt, upon which is pivotally mounted a hinge lever 114 closely resembling the hinge lever 18 and similarly of approximately J-shaped form with a curved portion 116 having a transversely-bent flange 118 drilled to receive fastener bolts 120 securing it to the inner wall 122 of the vehicle closure or lid 124. The hinge bracket 108 consists of spaced parallel base portions 126 (Figure 9) provided with perpendicular outwardly-facing flanges 128 at their upper edges and with inwardly-facing tubular bosses 130 containing holes 132 receiving the pivot bolt 112 carrying the retaining nut 134 on its threaded end. As in Figure 1, the hinge lever 114 is drilled intermediate its ends to receive the pivot bolt 112, and passes between the inner ends of the tubular bosses 130 (Figure 9).

Immediately below the parallel base portions 126, the hinge bracket 108 is provided with perpendicular inwardly-projecting portions 136 (Figure 9) which meet one another at the upper ends of downwardly-projecting arcuate arm halves 138 which are bent face to face with one another along a connecting portion 140 to provide a single arcuate arm 142 of double thickness equipped with aligned matching holes 144 at its outer end 145.

The support member 110 which forms the second part of the mounting bracket structure 106 (Figures 9 to 11 inclusive) is in the form of a zigzag bent strip of sheet metal having a flat central portion 146 equipped with an elongated hole 148 of elongated rectangular outline. The opposite ends of the central portion 146 are connected by diverging intermediate portions 150 to mounting tabs or base portions 152 disposed in substantially the same plane at opposite ends of the support member 110 and provided with holes 154 for the reception of bolts or other fasteners 156 welded or otherwise secured to the bulkhead 102, which is suitably drilled for the purpose (Figure 8). Retaining nuts 158 threaded upon the shanks of the bolts 156 secure the support member 110 to the bulkhead 102. In the assembled form of the mounting bracket structure 106, one flange 128 is hooked over the upper edge of the central portion 146 of the support member 110 and effectively prevents rocking or wobbling of the component parts 108 and 110 of the mounting bracket structure 106 relatively to one another when they are held in assembly by the pivot bolts 112 which, as will be seen from Figure 9, pass not only through the aligned bores 132 of the tubular bosses 130 but also through the elongated rectangular hole 148 in the support member 110. In order to prevent rotation of the pivot bolt 112, the latter is provided with a squared portion 160 snugly but slidably fitting the elongated rectangular hole 148 in the support member 110.

The inner end 162 of the lever 114 is provided with a hole 164 into which is hooked the upper end of a tension spring 166, the lower end of which is hooked into the holes 144 at the outer end 145 of the arcuate double-thickness arm 142.

The operation of the modified closure hinge 100 of Figures 7 to 9 inclusive is similar to that of the closure hinge 10 described in connection with Figures 1 to 3 inclusive, with the difference that the two hinges 100 used in each installation are mounted upon substantially parallel vertical walls or bulkheads 102 rather than depending from an approximately horizontal deck or cowl. The spring 166 is placed under tension when the closure or deck 124 is pulled or pushed down into place, as shown in Figure 7, where it is held in position by a conventional latch or lock (not shown). When the lock or latch is released, the closure or lid 124 flies upward a short distance in response to the pull of the tensioned spring 166, so that the operator is enabled to insert his hands beneath it to lift it further upward to its fully opened position. The elongated rectangular holes 148 in the support members 110 assist the workmen on the assembly line in installing the two hinges 100 of each set, and if the lid 124 or body deck 104 become bent or distorted relatively to one another, the elongated holes 148 enable compensation to be made for such misalignment, by loosening the nuts 134 and relocating the squared portions 160 of the bolts 120 at a different position in either or both elongated rectangular slots 148.

When the assembly again is in proper alignment, the nuts 134 are again tightened. The provision of two flanges 128 at the upper edges of the parallel base portions 126 of the hinge bracket 108 (Figure 9) enables the same structure to be mounted on the right-hand or left hand side walls or bulkheads of the vehicle body, thereby providing right-hand and left-hand installations.

What I claim is:

1. In combination in a sheet metal hinge lever mounting bracket unit for a vehicle body closure hinge, a hinge lever mounting bracket consisting of elongated metal strip structure of relatively narrow width in proportion to its length including a pair of laterally-spaced hinge lever supporting walls having transverse upper flanges integral with their upper edges and extending outwardly therefrom, and transverse lower flanges integral with their lower edges and extending inwardly therefrom substantially into abutting engagement with one another, and an elongated spring anchorage arm integral with and extending downwardly from each of said lower flanges abutting one another with their lower ends offset relatively to said hinge lever supporting walls, said walls having aligned pivot element mounting means thereon and said arms having spring anchorage means on their offset lower ends disposed remote from said lower flanges; and a hinge bracket supporting member having a central portion engaging one of said walls and one of said upper flanges, and supporting legs extending rearwardly from said central portion.

2. In combination in a sheet metal hinge lever mounting bracket unit for a vehicle body closure hinge, a hinge lever mounting bracket consisting of elongated metal strip structure of relatively narrow width in proportion to its length including a pair of laterally-spaced hinge lever supporting walls having transverse upper flanges integral with their upper edges and extending outwardly therefrom, and transverse lower flanges integral with their lower edges and extending inwardly therefrom substantially into abutting engagement with one another, and an elongated spring anchorage arm integral with and extending downwardly from each of said lower flanges abutting one another with their lower ends offset relatively to said hinge lever supporting walls, said walls having aligned pivot element mounting means thereon and said arms having spring anchorage means on their offset lower ends disposed remote from said lower flanges; and a hinge bracket supporting member having a central portion engaging one of said walls and one of said upper flanges, and supporting legs extending rearwardly from said central portion, said central portion having an elongated hole therein adapted to adjusably receive a pivot element extending through said central portion and through one of said walls into the space therebetween.

References Cited in the file of this patent

UNITED STATES PATENTS

| | | |
|---|---|---|
| 2,177,294 | Soss | Oct. 24, 1939 |
| 2,235,984 | Devereaux | Mar. 25, 1941 |
| 2,543,600 | Roethel | Feb. 27, 1951 |
| 2,671,928 | Bright | Mar. 16, 1954 |